(12) United States Patent
Zhang

(10) Patent No.: US 7,243,896 B2
(45) Date of Patent: Jul. 17, 2007

(54) STRENGTHENED FOLDABLE SUPPORT FRAME

(75) Inventor: Chongyi Zhang, Suzhou (CN)

(73) Assignee: Chervon International Trading Co., Ltd. (CN)

( * ) Notice: Subject to any disclaimer, the term of this patent is extended or adjusted under 35 U.S.C. 154(b) by 138 days.

(21) Appl. No.: 10/886,382

(22) Filed: Jul. 7, 2004

(65) Prior Publication Data

US 2005/0011421 A1    Jan. 20, 2005

(30) Foreign Application Priority Data

Jul. 17, 2003    (CN)    ............... 03 2 59720

(51) Int. Cl.
*F16M 11/00*    (2006.01)
(52) U.S. Cl. .................. 248/676; 248/164; 248/166; 248/432; 269/122
(58) Field of Classification Search ............ 248/164, 248/431, 432, 440, 370, 188, 291.1, 676, 248/188.6, 166; 108/118, 116; 280/649; 269/901, 122 X, 124, 126
See application file for complete search history.

(56) References Cited

U.S. PATENT DOCUMENTS

| | | | | |
|---|---|---|---|---|
| 271,895 A * | 2/1883 | Miller | ......... | 108/116 |
| 287,739 A * | 10/1883 | Tull | ......... | 108/171 |
| 800,233 A * | 9/1905 | McConnell | ......... | 248/164 |
| 1,876,400 A * | 9/1932 | Cederquist | ......... | 108/118 |
| 2,829,863 A * | 4/1958 | Gibson | ......... | 254/8 C |
| 2,845,317 A * | 7/1958 | Orman | ......... | 248/164 |
| 2,849,745 A * | 9/1958 | Madsen | ......... | 15/268 |
| 3,988,021 A * | 10/1976 | Grover | ......... | 473/15 |
| 4,133,412 A * | 1/1979 | Hildebrandt | ......... | 182/154 |
| 4,148,264 A * | 4/1979 | Caravias | ......... | 108/145 |
| 4,239,259 A * | 12/1980 | Martinez | ......... | 280/649 |
| 4,815,391 A * | 3/1989 | Lee | ......... | 108/7 |
| 5,004,029 A * | 4/1991 | Garner | ......... | 144/287 |
| 5,011,104 A * | 4/1991 | Fang | ......... | 248/125.8 |
| 5,833,201 A * | 11/1998 | Graybill | ......... | 248/462 |
| 6,722,618 B1 * | 4/2004 | Wu | ......... | 248/166 |

* cited by examiner

*Primary Examiner*—Korie Chan
(74) *Attorney, Agent, or Firm*—McDermott Will & Emery LLP

(57) ABSTRACT

A foldable support frame for supporting a tool is provided. The support table comprises a first pair of legs disposed one in parallel with the other. The table further comprises a second pair of legs disposed one in parallel with the other. The second pair of legs are pivotally connected to the first pair of legs proximate a midpoint so that the first and second pairs of legs are movable to a crossing position. Each of the first and second pairs of legs have a top end and a base end. The support table also has a first connection bar connectedly disposed between first pair of legs, and a second connection bar connectedly disposed between first pair of legs. Tool supporters are fixedly connected between the respective top ends of the first and second pairs of legs. The support table also has a support rod having a first end and a second end. The first end of the support rod is connected to the first connection bar and the second end of the support rod is connected at the to the first tool supporter.

13 Claims, 5 Drawing Sheets

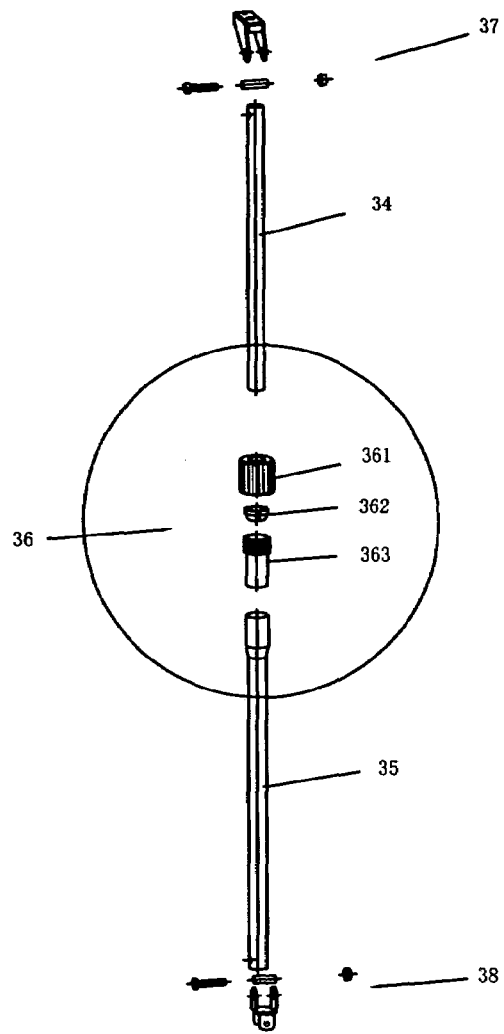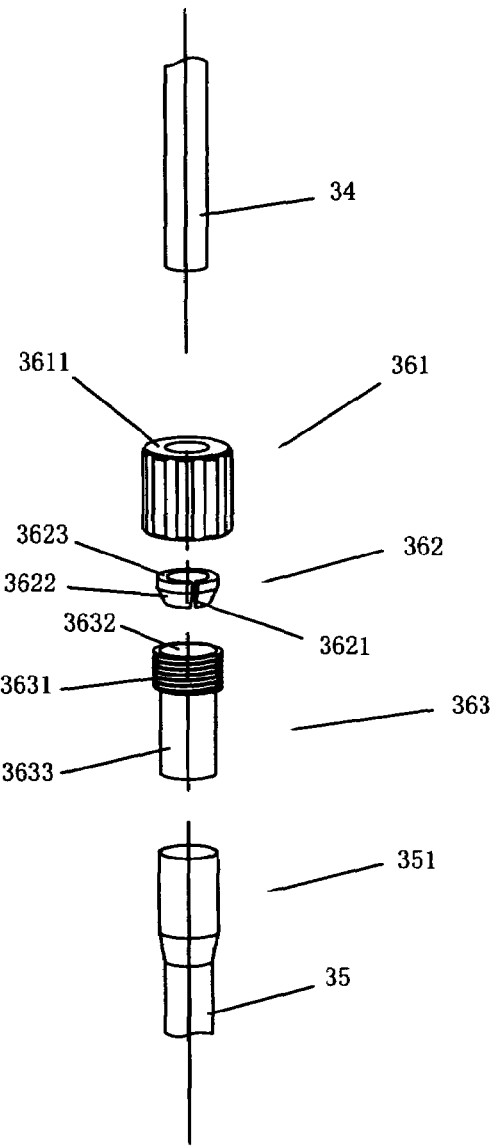
FIG. 2A
FIG. 2B

STRENGTHENED FOLDABLE SUPPORT FRAME

RELATED APPLICATIONS

This application claims priority from Chinese Application No. 03 2 59720.7, filed on Jul. 17, 2003.

FIELD OF THE INVENTION

The present invention relates to a support frame, and more particularly to a foldable support frame for supporting a cutting machine or similar tool, that can be quickly and easily folded for storage and transport and unfolded.

BACKGROUND OF THE INVENTION

Work tables or work benches are often used in connection with cutting machinery and various other power or manual power tools. Because such tools have become increasingly more portable, it has become more desirable for work tables or benches to also be portable.

In an attempt to address this issue, work tables such as that disclosed in U.S. Pat. No. 6,722,618 to Wu have been developed. Wu discloses a foldable table frame for supporting a cutting machine. The legs of the table in Wu are adjustable, such that it can be quickly and easily folded for storage and transport, and unfolded for use in supporting a cutting machine or tool. While the table in Wu has enjoyed a great degree of success, there still exist some limitations inherent to the table disclosed therein. For example, the stability of the foldable table in Wu may be limited or compromised when the table is used to support heavier machines. This is particularly true when the legs of the table are spread far apart to create a wider loading surface.

The present invention is provided to solve the problems discussed above and other problems, and to provide advantages and aspects not provided by prior support frames of this type. A full discussion of the features and advantages of the present invention is deferred to the following detailed description, which proceeds with reference to the accompanying drawings.

SUMMARY OF THE INVENTION

One object of the present invention is to provide a strengthened support frame with foldable and telescoping legs for supporting a cutting machine or similar tool. The present invention keeps the advantages of the prior art such as being foldable, telescoping, light and convenient, while providing a support frame that can support increased loading ability even when the legs extended to a large angle.

According to the present invention, a strengthened foldable support frame is provided. The support frame generally comprises a first and second pair of crossed legs pivotally connected together. The foldable main frame portion further comprises a first connection bar for connecting the two first crossed legs in a parallel manner, a second connection bar for connecting the two second crossed legs in a parallel manner, a first tool supporter fixedly connects between two top ends of the two first crossed legs, and a second tool supporter fixedly connects between two top ends of the two second crossed legs. The support frame further comprises a support rod, which is attached at one end to the first connection bar and at an opposed second end to the second tool supporter. Alternative, the support rod is connected between the second connection bar and the first tool supporter.

According to one aspect of the present invention, two opposing stoppers separately supported between each of the first and second crossed legs to limit the inclination of each first and each second crossed legs.

According to another aspect of the present invention, the first and second pairs of legs, and the support rod each comprise an upper slide rod and a support leg. The support rod connects between connection bar and tool supporter by universal joints. Each upper slide rod is slidable within a relevant support leg. The foldable support frame reaches its set-up height and width when the upper slide rods are put out furthest and the two tool supporter are extended thoroughly. Meanwhile, the support rod reaches a corresponding height. Otherwise, folding the two brackets, and pushing the upper slide rods of the two crossed legs and the support rod down into their respective support legs, the cubage of the support frame is therefore reduced.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 2A is a perspective view of the support rod of the strengthened support frame according to the present invention;

FIG. 2B is an enlarged partial perspective view of FIG. 2A;

DETAILED DESCRIPTION OF THE PREFERRED EMBODIMENT

Figure 1:
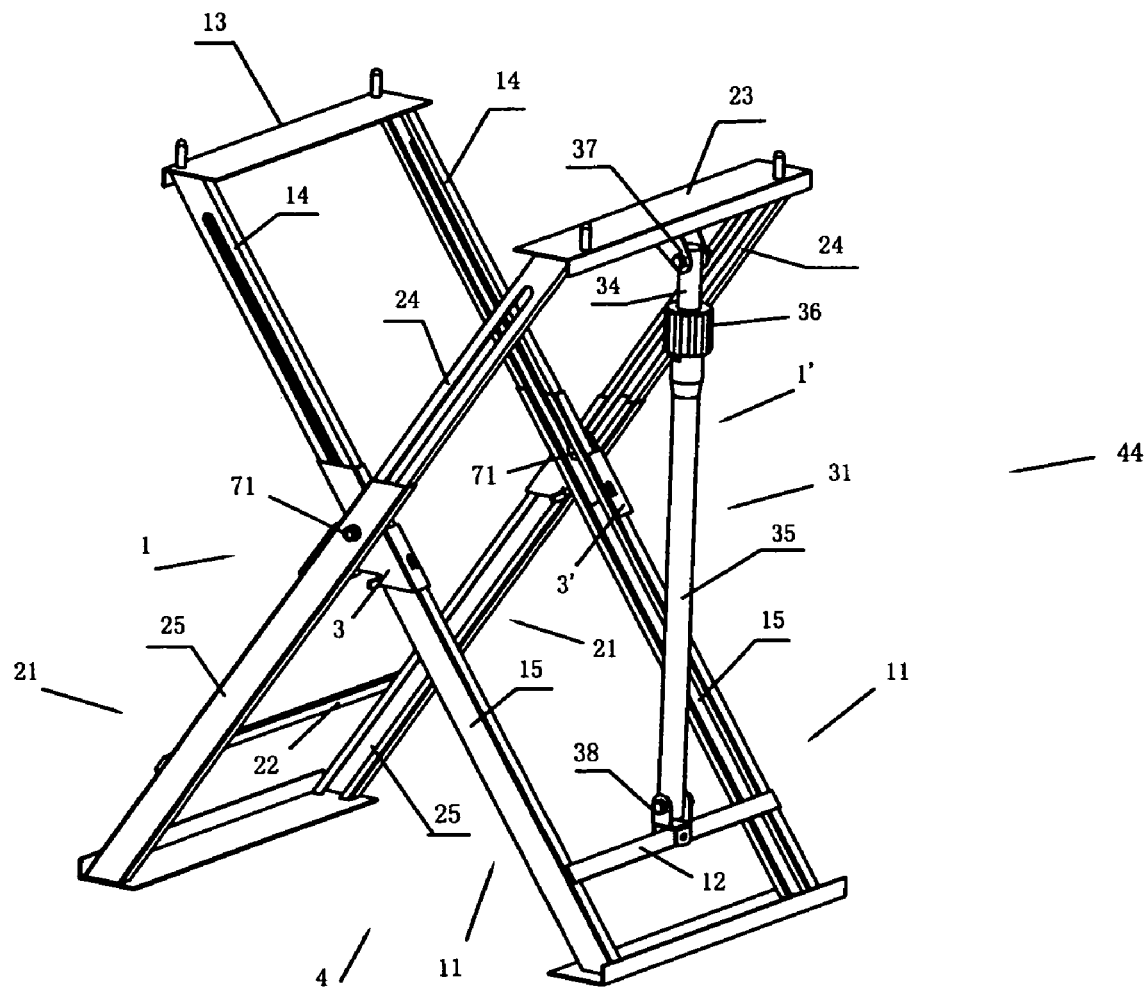
FIG. 1 is a perspective view of an entirely unfolded strengthened support frame according to the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a strengthened support frame 44 of the present invention is shown. The support frame 44 comprises a foldable main frame portion 4, a support rod 31, a first joint means 37 and a second joint means 38. The foldable main frame portion 4, is of the type disclosed in U.S. Pat. No. 6,722,618, the disclosure of which is hereby incorporated by reference. Specifically, the main frame portion 4 comprises two opposing pairs of brackets 1, 1' each of which comprises a first and second pair of crossed legs 11, 21 pivotally connected together by a connection means 71 and a stopper 3 or 3'. The foldable main frame portion 4 further comprises a first connection bar 12 and a second connection bar 22 respectively supporting the two first crossed legs 11 and the two second crossed legs 21 in a parallel manner, a first tool supporter 13 fixedly connects between two top ends of the two first crossed legs 11, a second tool supporter 23 fixedly connects between two top ends of the two second crossed legs 21. The stopper 3, 3' are used for limiting the inclination of each of the first and second crossed legs 11, 21. Each of the first and second crossed legs 11, 21 further comprises an upper slide rod 14, 24 and a support leg 15, 25. And each upper slide rod 14, 24 can slide within a respective support leg 15, 25. By such foregoing mentioned way, the two pairs of brackets 1, 1' can be folded and contracted.

A support rod 31 pivotally connected between the first connection bar 12 and the second tool supporter 23 by two universal joints 37, 38. According to one embodiment of the present invention, the support rod 31 comprises a support leg 35 and an upper slide rod 34, whose outside diameter is slightly smaller than inner diameter of the former. Furthermore, a locking mechanism 36 is provided between the upper slide rod 34 and the support leg 35. By releasing the locking mechanism 36, the upper slide rod 34 can then slide within the support leg 35. Otherwise, the upper slide rod 34 will be fixed relate to the support leg 35 when lock the locking mechanism 36. The support rod 31 may support between the second connection bar 22 and the first tool supporter 13 instead.

Alternatively, two support rods 31 can be simultaneously provided to enhance the loading ability of the frame. According to such an embodiment, the first end of the second support rod 31 is connected to the second connection bar 22 and the second end of the second support rod 31 is connected at the to the second tool supporter 23.

Referring to FIG. 2A and FIG. 2B, the support rod 31 includes an upper slide rod 34, a support leg 35 and a locking mechanism 36. The locking mechanism 36 comprises an inner threaded (not shown) cover 361 with a top plane 3611, a locking block 362 which comprises a coniform surface 3622 at the bottom and a gap 3621, and a fixing sleeve 363. The fixing sleeve 363 comprises a bottom tube 3633 which can insert into an upper portion 351 of the support leg 35, a top outer thread portion 3631 which matches up with the inner threaded cover 361, and an inner coniform surface 3632 at the top to match up with the corresponding coniform surface 3622 of the locking block 362. To assemble the locking mechanism 36, the bottom tube 3633 of the fixing sleeve 363 should be inserted into and fixed within the upper port 351 of the support leg 35; the upper slide rod 34 is inserted into the support leg 35 through the inner threaded cover 361, the locking block 362 and the fixing sleeve 363; the inner threaded cover 361 is screwed to the fixing sleeve 363 with the locking block 362 therein. Further screwing the inner threaded cover 361, the top plane 3611 then pushes on the upper surface 3623 to force the locking block 362 slides down along the coniform surface 3632 of the fixing sleeve 363, simultaneously a pressure is acted on the coniform surface 3622 of the locking block 362 from the corresponding coniform surface 3632 of the fixing sleeve 363, the gap 3621 is then reduced, and thus the locking block 362 wraps the upper slide rod 34 tightly to fix the upper slide rod 34 within the support leg 35. Otherwise, unscrewing the inner threaded cover 361 to release the top plane 3611 from the supper surface 3623 of the locking block 362, the locking block 362 will slide upwardly with the gap 3621 expanded, and therefore the upper slide rod 34 can freely slide within the support leg 35. Consequently, by the effect of the locking mechanism 36, the support rod 31 is retractile along with the flexing of the main frame portion 4, and the upper slide rod 34 can be fixed within the support leg 35 at any required position.

Figure 3:
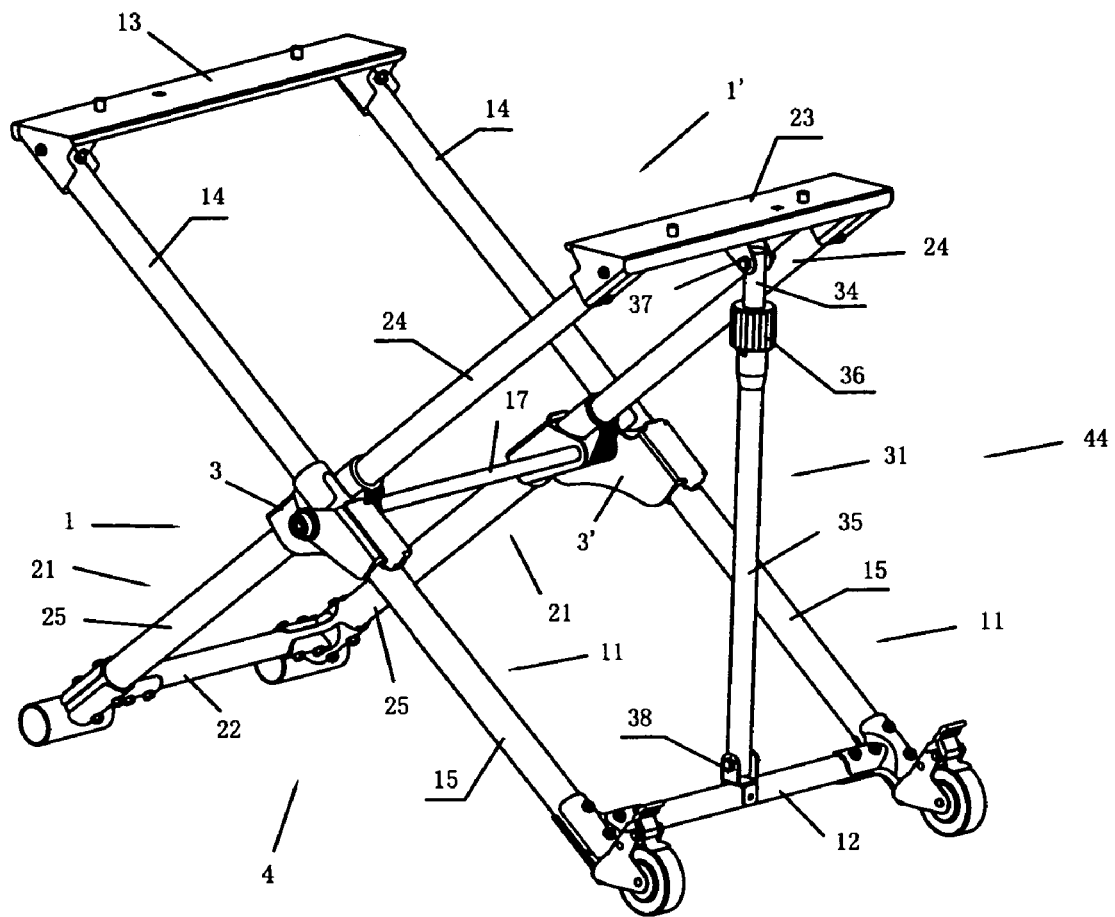
FIG. 3 is a perspective view of another embodiment of the strengthened support frame according to the present invention.
Figure 4:
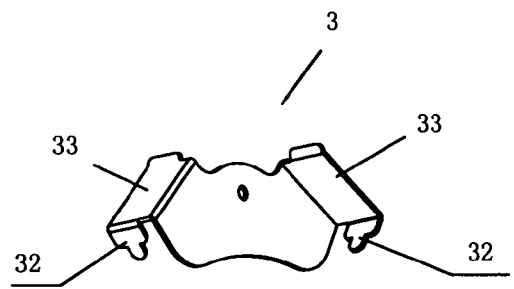
FIG. 4 is a perspective view of a stopper of the strengthened support frame of FIG. 3.
Figure 5:
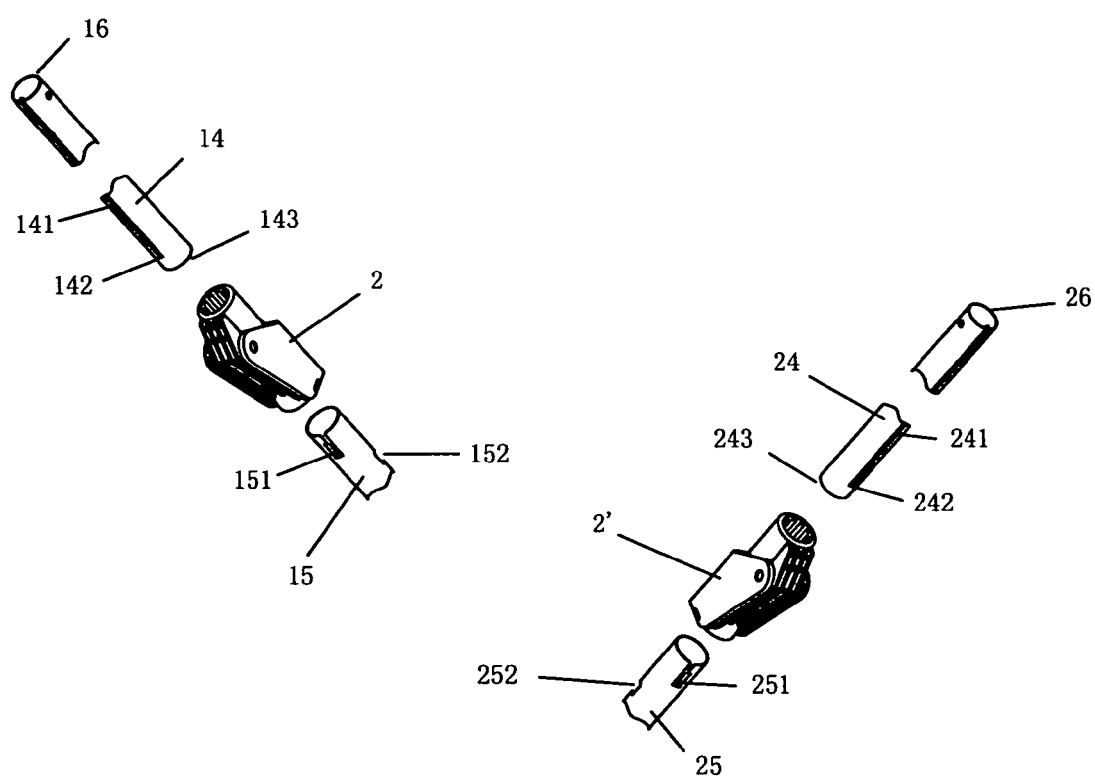
FIG. 5 is a perspective view of the upper slide rods and the support legs of a first and a second crossed leg of the strengthened support frame of FIG. 3.

According to one embodiment of the invention shown in FIG. 3, the upper slide rods 14, 24, 34 and the support legs 15, 25, 35 are tubular in shape. According to this embodiment, and a s shown in FIG. 5, a clamp sleeve 2, 2' is preferably provided between each upper slide rod 14, 24 and each respective support leg 15, 25 of each first and second crossed leg 11, 21. The clamp sleeves 2, 2' are pivotally joined to each other by a connecting rod 17. Referring to FIG. 4, a tab 32 is formed on each of the turned side flanges 33 of each stopper 3, 3'. Referring to FIG. 5, an aperture 152, 252 is formed on each support leg 15, 25. A bottom end 142, 242 of each slot 141, 241 is stopped by each tab 151, 251 of each support leg 15,25 when the upper slide rods are thoroughly pulled and the brackets 1, 1' are unfolded to form a maximum angle. In this position, each tab 32 is inserted into the aperture 152, 252 of its respective support leg 15, 25 to support the bottom end 143, 243 of its respective upper slide rod 14, 24 to form a rigid and thoroughly unfolded support frame 44.

Figure 7:
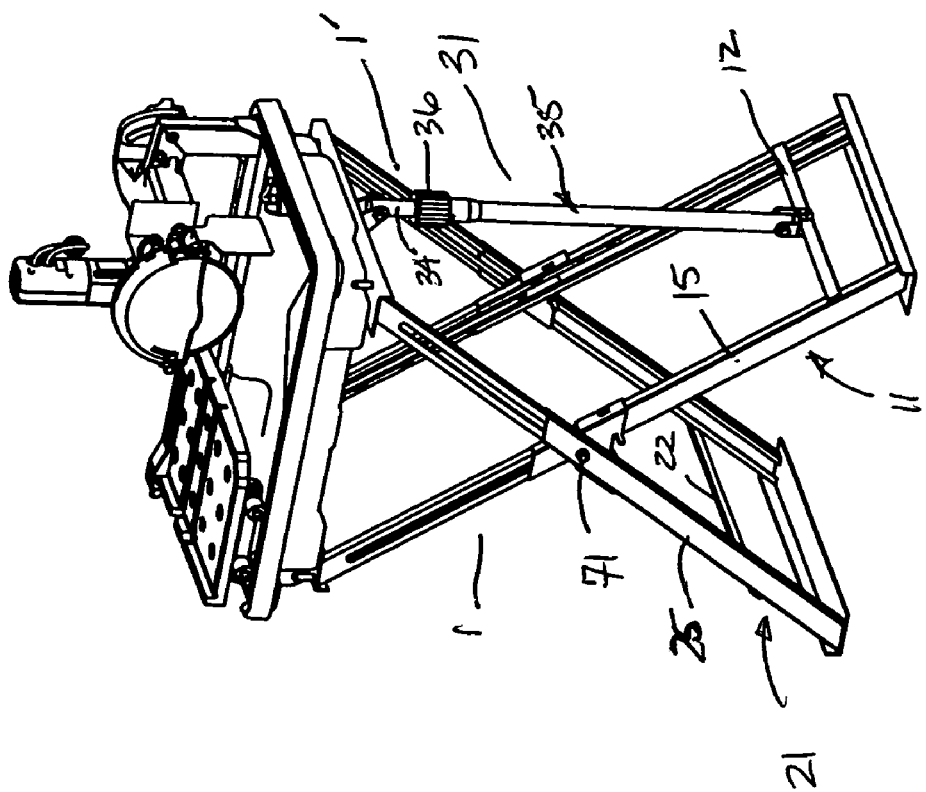
Figure 6:
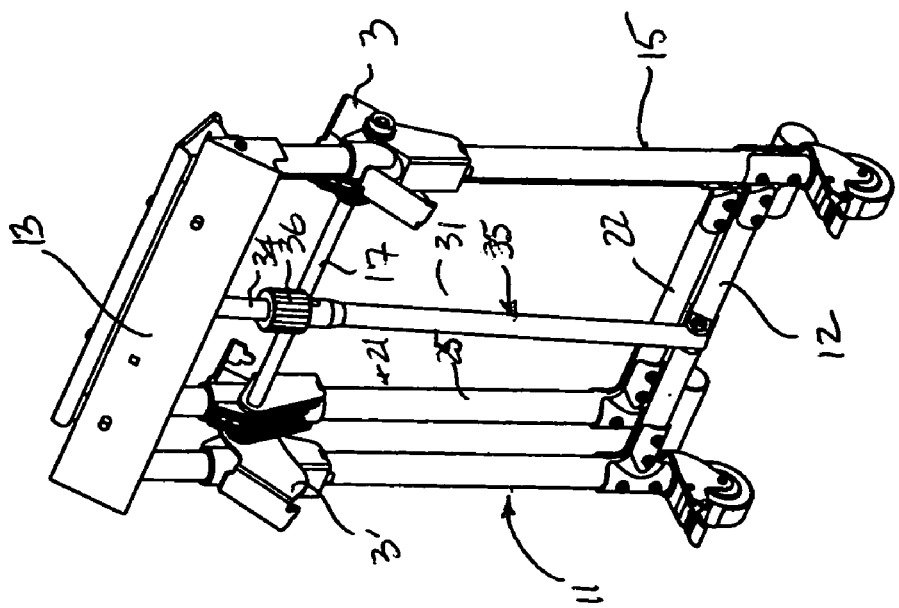
FIG. 6 is a perspective view of the foldable support frame of FIG. 3 in a retracted and folded position; and, FIG. 7 is a perspective view of the foldable support frame supporting a cutting machine.

To fold the support frame 44, a user should merely unlock the locking mechanism 36, fold and push down the brackets, the upper slide rods 14, 24, 34 can then be drawn back into their respective support legs 15, 25, 35, as shown in FIG. 6. By extending the main frame portion 4, the support rod 31 will be extended. When the frame 44 is entirely extended, lock the locking mechanism 36, and then the support frame 44 is rigidly extended for supporting a cutting machine or the like, as shown in FIG. 7.

While the specific embodiments have been illustrated and described above, these embodiments, of course, are not to be construed as limiting the ranges of the present invention. Modifications, and other alternative constructions, will be apparent which are within the spirit and scope of the invention, and the scope of protection is only limited by the scope of the accompanying claims.

What is claimed is:

1. A support frame for supporting a tool, comprising:
   a first pair of legs disposed one in parallel with the other, each of the first pair of legs having a top end and a base end and being comprised of an upper slide portion and a lower support portion, the upper slide portion being extendable with respect to the lower support portion;
   a second pair of legs disposed one in parallel with the other, each of the second pair of legs having a top end and a base end and being comprised of an upper slide portion and a lower support portion, the upper slide portion being extendable with respect to the lower support portion, the second pair of legs being pivotally connected to the first pair of legs proximate a midpoint, the first and second pair of legs being movable to a crossing position;
   a first connection bar connectedly disposed between the first pair of legs;
   a second connection bar connectedly disposed between the second pair of legs;
   a first tool supporter connected between the top end of the first pair of legs;
   a second tool supporter connected between the top end of the second pair of legs; and,
   a support rod having a first end and a second end, the first end of the support rod being connected to the first connection bar and the second end of the support rod being connected to the second tool supporter, wherein when the first and second pair of legs are moved to a crossing position, the support rod is substantially perpendicular to a support plane defined by the first and second tool supporters.

2. The support frame of claim 1, wherein the support rod further comprises a pivotal joint connector attached to the first and second ends of the support rod.

3. The support frame of claim 1, wherein the support rod comprises an upper slide rod, a support leg and a locking mechanism.

4. The support frame of claim 3, wherein the locking mechanism comprises:
an inner threaded cover;
a locking block comprising a coniform surface and a gap; and
a fixing sleeve comprising:
a bottom tube slidably inserted into an upper portion of the support leg;
a top outer thread portion corresponding with the inner threaded cover; and
an inner coniform surface corresponding with coniform surface of the locking block.

5. The support frame of claim 1, wherein an elongated slot is disposed in each upper slide portion for receiving a corresponding tab from its respective support leg.

6. The support frame of claim 5, further comprising stoppers separately mounted proximate respective crossing points of the first and second pairs of legs, each stopper comprising a pair of side flanges extending in opposite directions, the side flanges limiting inclination of each of the first and second pairs of legs crossed legs, and a support tab extending from each side flange for insertion into an aperture formed in its respective support leg.

7. The support frame of claim 1, further comprising a second support rod, the second support rod having a first end and a second end, the first end of the second support rod being connected to the second connection bar and the second end of the second support rod being connected to the first tool supporter.

8. The support frame of claim 7, wherein the second support rod further includes a pivotal joint connector at its first and second ends.

9. The support frame of claim 7, wherein the second support rod comprises an upper slide rod, a support leg and a locking mechanism.

10. The support frame of claim 9, wherein the locking mechanism comprises:
an inner threaded cover;
a locking block comprising a coniform surface and a gap; and
a fixing sleeve comprising:
a bottom tube slidably inserted into an upper portion of the support leg;
a top outer thread portion corresponding with the inner threaded cover; and
an inner coniform surface corresponding with coniform surface of the locking block.

11. A foldable support frame comprising:
a first pair of telescoping legs having a slide portion and a support portion, the support portion having an aperture formed therein;
a second pair of telescoping legs having a slide portion and a support portion, the support portion having an aperture formed therein;
a connecting member pivotally connecting the first pair of telescoping legs to the second pair of telescoping legs;
a first stopper mechanism pivotally mounted on a first end of the connecting member and having first and second flanges, each flange having a tab which fits within the apertures formed in the support portions of the telescoping legs proximate the first end of the connecting member;
a second stopper mechanism pivotally mounted on a second end of the connecting member and having first and second flanges, each flange having a tab which fits within the apertures formed in the support portions of the telescoping legs proximate the second end of the connecting member;
wherein the flanges of the first stopper mechanism limit pivotal movement of the telescoping legs proximate the first end of the connecting member and the flanges of the second stopper mechanism limit pivotal movement of the telescoping legs proximate the second end of the connecting member; and
the support frame further having:
a first position wherein the first and second pair of telescoping legs form an angle with respect to each other, and being pivoted about the connecting member; the slide portions of the telescoping legs are extended from the support portions so that the tabs of the first and second stopper mechanisms are engaged in the apertures of the support portions of the telescoping legs and support the respective slide portions of the telescoping legs; and
a second position wherein the first and second pair of telescoping legs are substantially parallel to each other and the tabs of the first and second stopper mechanisms are disengaged from the apertures of the support portions of the telescoping legs so that the slide portions of the telescoping legs can be retracted.

12. The foldable support frame of claim 11 further comprising a tool support member connected to the slide portion of the first pair of telescoping legs.

13. The foldable support frame of claim 12 further comprising a bar connecting the support portions of the second pair of telescoping legs and a support rod connected at a first end to the tool support member and at a second end to the bar connecting the support portions of the second pair of telescoping legs.

* * * * *